Nov. 30, 1937.    O. RASMUSSEN    2,100,488
BRAKE ADJUSTMENT
Filed June 3, 1936    2 Sheets-Sheet 1
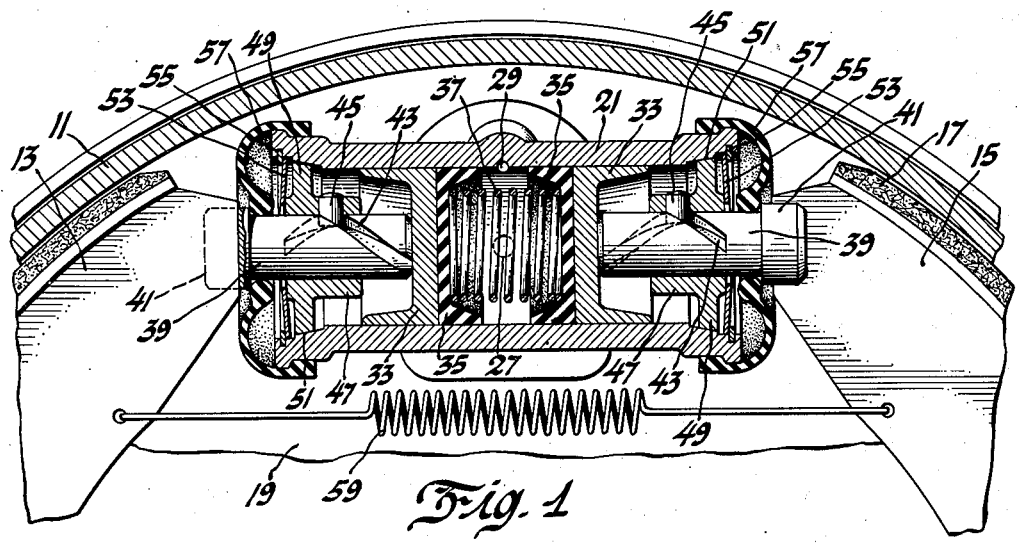
Fig. 1
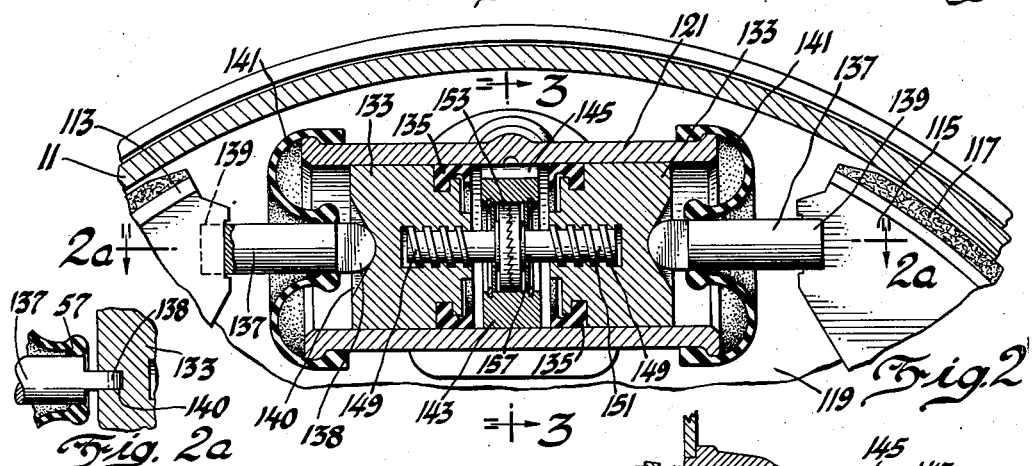
Fig. 2
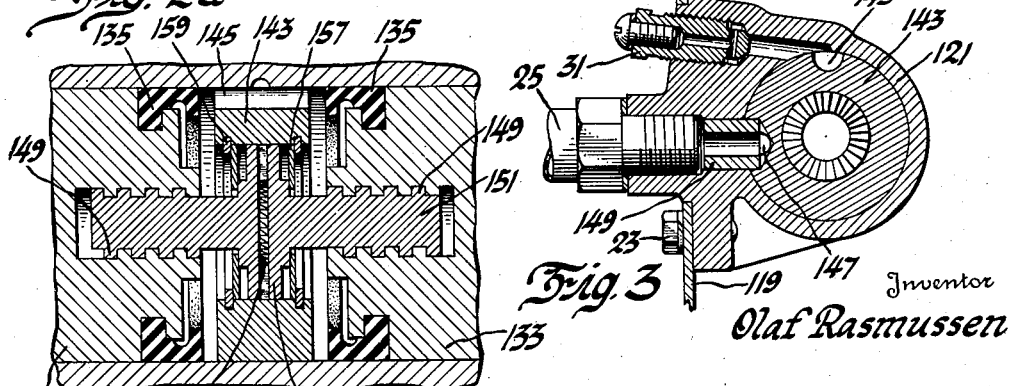
Fig. 2a
Fig. 3
Fig. 4
Inventor
Olaf Rasmussen Inventor
Olaf Rasmussen Patented Nov. 30, 1937

2,100,488

UNITED STATES PATENT OFFICE 2,100,488

BRAKE ADJUSTMENT

Olaf Rasmussen, Dayton, Ohio, assignor to General Motors Corporation, Detroit, Mich., a corporation of Michigan Application June 3, 1936, Serial No. 83,178

11 Claims. (Cl. 188—79.5)

This invention relates to brakes, particularly to hydraulic brake applying means as used on vehicles.

The object of the invention is to provide improved means to take up excessive clearances between the conventional drum and shoes and at the same time to maintain a predetermined clearance to accommodate variations in drum contour due to expansion, contraction and distortion.

A further object is to provide means to accomplish the major objects by a construction so located and arranged that the movable parts are protected from foreign matter.

A still further object is the accomplishment of the above objects by a construction which shall be highly efficient yet simple and comparatively inexpensive.

Other objects and advantages will be understood from the description which follows.

On the drawings, Fig. 1 is a transverse section through a brake drum showing the invention associated with the shoe actuating means.

Fig. 2 is a similar section of a modified embodiment.

Fig. 2a is a sectional view, partly broken away, as seen from line 2a—2a of Fig. 2.

Fig. 3 is a section on line 3—3 of Fig. 2.

Fig. 4 is a longitudinal section through the actuating means of Fig. 2.

Figure 5:
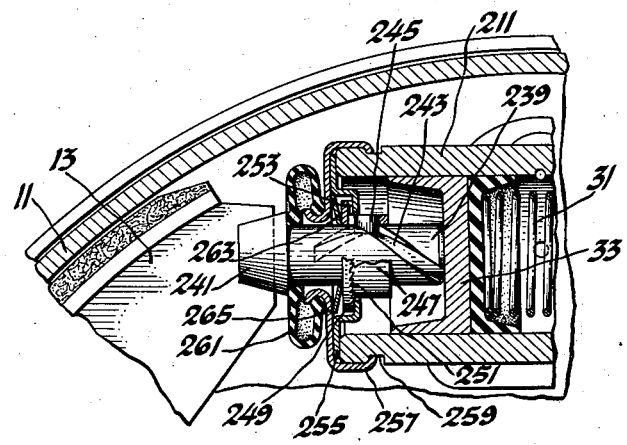
Fig. 5 is a transverse section through the drum showing a further modification.

Referring to Fig. 1, numeral 11 represents a conventional drum flange engaged by shoes 13 and 15 having a lining 17. A drum cover or backing plate 19 carries the wheel cylinder 21 of a hydraulic brake applying system. The cylinder may be secured to the backing plate by the same means 23 as that shown in Fig. 3. Also, there will be used a conduit like 25 of Fig. 3 from a master cylinder (not shown) communicating with an intermediate part of the cylinder as at 27. For permitting the escape of air there is a small opening 29. This will be normally closed by a screw plug 31 of Fig. 3. Since no invention is here claimed for the plug, a more detailed description is omitted.

Within the cylinder are two opposed pistons 33 having cup-like seals 35. The pistons with their seals are spaced by a spring 37. Outward movements of the pistons are imparted to the shoes by means of plungers 39. The end of each plunger is bifurcated to straddle the web of the shoe as shown by numeral 41. The plunger is thus held from rotation. The plunger is provided with a long lead helical groove 43 into which projects a pin 45 carried by the hub 47 of a conical clutch 49, the latter adapted to engage a cooperating conical seat 51 near the end of the cylinder. The clutch 49 is engaged by the central part of a spring washer 53 of the Belleville type held inwardly by a snapped-in retainer 55 which engages the outer periphery of the washer. A protecting boot of rubber 57 engages the cylinder and plunger and excludes foreign matter. The usual brake-releasing spring 59 is connected to the two shoes to hold them in brake-releasing position.

The operation is as follows: Fig. 1 may be assumed as showing the parts with the brake released. The conical clutch faces are engaged and hold the plunger from further inward movement since inward movement of the plunger relative to the clutch is prevented by means of the pin of the clutch engaged in the helical groove of the plunger. When fluid is forced through opening 27, the pistons are spread apart. Each piston acts upon its plunger to advance its shoe into frictional contact with the drum. In doing so it first carries the clutch 49 axially with it for the reason that the spring 53 initially offers less resistance to this action than the groove offers to the rotation of the clutch with its pin 45. While the plunger is being thus advanced during this first stage of its motion, any clearance between the shoe and drum is being taken up. Also, the movement of the clutch 49 is stressing the disc spring 53. After the movement in taking up clearance exceeds a predetermined amount, the spring 53 is so stressed that it offers greater resistance to the outward movement of the clutch 49 than the pin and slot formation offers to a rotary movement thereof. Therefore, if effective brake application requires axial movement of plunger 39 after the spring 53 is stressed as explained, as will occur with excessive lining wear, the pin 45 travels in the slot and the clutch 49 moves inwardly and spirally along the plunger until the brakes are fully applied. In the return movement of the plunger the clutch 49 moves axially together with it until the seat 51 stops the movement. This axial movement provides a predetermined maximum clearance for the gap between the drum and shoes, which clearance is necessary to accommodate changes in the drum due to temperature and pressure. It will be seen that the clearance between the shoe and drum which is necessary to accommodate changes in drum contour is provided and is measured by the axial movement of the clutch 49 while the stress spring 53 is being relieved. Excessive brake applying movement required to compensate for lining wear is taken care of by the helical rotation of the clutch on the plunger. The later expedient therefore becomes an automatic adjustment to accommodate lining wear.

Fig. 2 shows a somewhat modified form. In this embodiment the drum 11 is frictionally engaged by shoes 113 and 115 having facings 117.

Backing plate 119 carries hydraulic wheel cylinder 121. The pistons 133 are slidably mounted in the cylinder and have a preferred form of seal 135 to prevent leakage, which seal is not claimed in this application. A plunger 137 transmits the pressure from the piston to the web of the shoe, the plunger being non-rotatable because of its bifurcated end 139. A suitable boot is shown at 141. Relative rotary movement between the piston 133 and plunger 137 is prevented by the slot 140 in the former and the flattened end 138 of the latter.

Centrally of the cylinder is a centralizer or block 143 provided with axial grooves such as 145 and 147 to permit escape of air from and inlet of liquid to the chambers adjacent the piston. Into groove 147 extends an apertured bushing 149. The bushing locks the block 143 in the cylinder 121 and its aperture is for the passage of the hydraulic medium. The pistons 133 are centrally threaded at 149 to receive the threaded rods 151, the heads 153 of which are located closely adjacent each other and have clutch teeth 155 for mutual engagement. The clutch elements of the heads are biased for mutual engagement by Belleville spring washers 157 engaging the heads 153 and snap rings 159 secured to the block 143.

The figures show the parts in the positions they occupy when the brake is released. The teeth 155 are mutually engaged. When fluid under pressure enters through conduit 25 and groove 147 to the region adjacent the pistons 133, the pistons are moved toward the ends of the cylinder. The clearance between the shoes and the drum is first taken up and thereafter frictional drag is effected. While the clearances are being taken up the rods 151 are carried along with the pistons, the clutch teeth 155 separating. In doing so the springs 157 are stressed and when sufficiently stressed they operate to hold the rods 151 from reciprocation. Under such circumstances the rods rotate in the pistons to assume new positions of inward adjustment. When the brake is released the springs 157 restore the rod heads 153 to clutch engagement and thus hold the piston in new positions somewhat outwardly from their former positions, whereby excessive clearance between the shoes and drums cannot occur, the clearance being always substantially that measured by the axial movement of the heads 153. This clearance is sufficient to provide for such changes in drum contour as may be due to temperature and pressure effects. Lining wear is compensated by the rotation of rods 151 in the pistons.

Still another form is shown by Fig. 5. This form differs from that of Fig. 1 mainly in that for the cone clutch there is substituted a tooth clutch. In this figure the drum 11 is engaged by shoes one of which is shown and marked 13. The cylinder 211 is mounted in the same way as is the cylinder 21 of Fig. 1. Within the cylinder there may be used the same pistons, one of which is shown at 33. Spring 31 is also used. Plunger rod 239 has a bifurcated end 241 to engage shoe 13. It has a long lead groove 243 engaged by a pin 245 carried by the hub 247 extending from a head 249, the latter having teeth 251 to engage cooperating teeth 253 on the inturned end of a member 255 secured to the end of the cylinder by a fastening clamp 257, the latter having one end part turned down into a channel 259 of the cylinder, an intermediate part bent over the member 255 and its other end shaped to receive and hold one end of a boot 261. The other end of the boot grips the plunger adjacent its bifurcated end. A flat or Belleville spring 263 engages the head 249 as shown, its outer periphery having an abutment at 265 on part 257. The operation will be understood from the description of the other embodiments. The axial movement of head 249 prior to its rotation relative to plunger 239 as a measure of the shoe clearance to provide for changes in drum contour, and excessive clearance is automatically taken up by rotation of head 249 relative to the plunger. The teeth at 251 and 253 function as the equivalent of the cone clutch of Fig. 1.

In the several forms already described, the pistons, subsequent to adjustments to counteract lining wear, return to new positions of adjustment outwardly toward the ends of the cylinder. This has the effect of increasing the capacity of the system. The necessary added fluid will ordinarily be supplied from the reservoir because in such systems the retracted position of the piston in the master cylinder opens a passage to the reservoir. In certain wheel cylinders the sealing device is not in the form of a rubber cup carried by the piston but takes the form of a diaphragm which is carried by and closes the cavity of the cylinder but expands to push the piston. In such forms it may be desirable that the piston return to a predetermined position after brake application, regardless of the action of the take-up devices.

Figure 6:
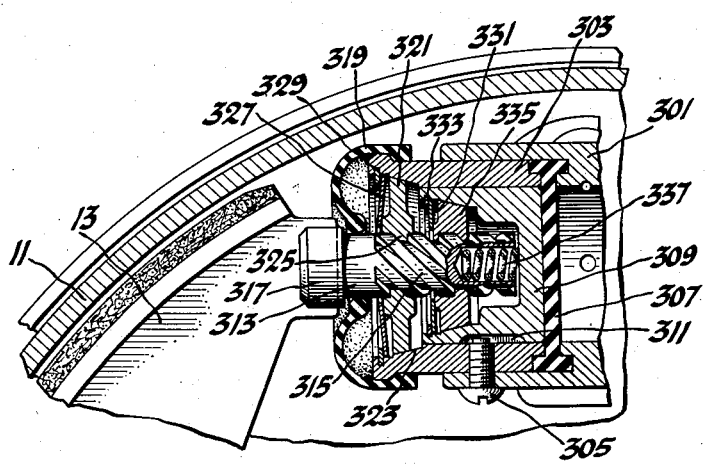
Fig. 6 is a similar section designed more particularly for a special kind of sealing means.

Fig. 6 shows a wheel cylinder of the type referred to in the above paragraph. The drum 11 is engaged by shoes, one of which is marked 13. The cylinder includes an intermediate part 301 and end parts, one of which is shown at 303. The two parts are secured together by a fastening means 305 and, when so fastened, the parts clamp between them a flexible expansible diaphragm 307. This diaphragm seals the hydraulic system proper from the region traversed by the pistons. It should be understood that the diaphragm shown is merely illustrative of that kind of seal which is anchored to the cylinder rather than being movable with the piston. Since this kind of diaphragm is adapted after each brake application to return to its initial position because of its own inherent resiliency, it may be thought best that the piston which it is designed to move should also return to its initial position. The piston is marked 309 and is provided with a slot 311 to receive the end of screw means 305 whereby the piston is guided in its reciprocation. A plunger 313 has an external helical grooved formation marked 315. The plunger has a forked end 317 to engage the web of shoe 13. A rubber boot 319 engages over the end of the cylinder and around the plunger to prevent the entrance of foreign matter. A conical clutch 321 engages a conical seat 323 on the inner wall of the cylinder. The clutch 321 has a toothed connection as at 325 with the threaded surface of the plunger. A spring 327 and retainer 329 correspond in structure and function with parts 53 and 55 of Fig. 1. The end of the piston carries a similar spring 331 and retainer 333, the spring biasing a cone clutch 335 into contact with a cooperating conical face on the piston. The clutch has a threaded connection with the plunger. The inner end of the plunger is bored out to receive a spring 337 seated therein and engaging the piston as clearly shown.

With this embodiment the brake is applied by bulging the diaphragm 307 which pushes the piston, the latter operable through the clutch 335 and its threaded connection with the plunger to move the latter and apply the brake. The normal clearance is determined by the axial movement of clutch 321 jointly with the plunger as before. When the brake is released after any correction for lining wear made by a rotary movement of clutch 321 along the plunger, the piston 309 would not return to its initial position in the absence of special provision for that purpose. In the present case the spring 337 functions to restore the piston to its initial position. In so doing it releases itself from clutch 335 and then pushes upon and moves this clutch with itself through the instrumentality of the spring 331. The threaded connection between the plunger and piston then produces a new relative position between these parts. In consequence, at the beginning of the next forward stroke of the piston, the clutch is available to immediately advance the rod and apply the brake as before.

I claim:

1. In a brake, a drum, a shoe to engage the drum, actuating means including reciprocable piston and plunger parts to move said shoe, first clutch means having a threaded engagement with one of said parts whereby said first clutch means is adjusted axially of the actuating means, and second clutch means adapted to be disengaged from the first clutch means to permit a limited joint movement of the said plunger part and the first clutch means and engage the first clutch means to limit the retracting movement of the shoe and actuating means.

2. The invention defined by claim 1, said clutch means having conical engaging faces.

3. The invention defined by claim 1, said threaded engagement comprising a helical groove in said plunger, said first clutch members having a part traversing said groove.

4. The invention defined by claim 1 together with yielding means biasing said clutch means to clutch engaging position and stressed under the influence of joint axial movement of said first clutch means and actuating means prior to relative rotation of said first clutch means and actuating means when the first clutch means becomes spring loaded.

5. In a brake, a drum, a shoe, a cylinder, a piston movable therein, a plunger between the piston and shoe, a first cone clutch having a threaded connection with the plunger to change its position axially thereof, said cylinder shaped to form a second and cooperating cone clutch, and yielding means carried by the cylinder and stressed by joint movement axially of the plunger and first cone clutch whereby thereafter further axial movement of the first cone clutch is prevented and the first cone clutch is rotated about and by the movement of the plunger to change its position axially of the plunger and to change the release position of the shoe upon brake release.

6. The invention defined by claim 5 together with a clutch device between the piston and plunger adapted to lock said piston and plunger during the working stroke of the latter and a spring to restore said piston to a predetermined initial position after brake application, said clutch adapted to release and to assume new positions axially of said plunger during such restoration.

7. In a brake, a drum, a shoe, a cylinder, a piston reciprocable therein, a plunger between the piston and shoe, clutch means between the cylinder and plunger, means limiting the movement of the clutch means axially of the cylinder, said clutch means having a threaded connection with the plunger whereby the active stroke of the piston first releases the clutch member by a joint axial movement and thereafter causes a relative displacement of the clutch member axially of the plunger to establish a new release position of the shoe and plunger.

8. The invention defined by claim 7 together with a spring between the plunger and piston to restore the latter to a predetermined initial position, a clutch between the piston and plunger through which all axial brake applying movements of the piston are transmitted to the plunger, said last-named clutch adapted to be released and shifted axially of the plunger during restoration of the piston as aforesaid.

9. In a brake, a drum, a shoe, a cylinder, a piston reciprocable therein, a plunger between the piston and shoe, a rod threaded in said piston, said rod having a head disposed centrally of the cylinder and shaped to constitute a clutch element, a cooperating clutch element, mechanism providing for said head a yieldingly resisted limited axial movement whereby when said piston is advanced the rod moves jointly therewith and releases the clutch in the process of taking up brake clearance and thereafter, when the limit of movement of the head is reached, the rod is rotated to new positions of axial adjustment relative to the piston to determine new release positions for the shoe and plunger.

10. In a brake, a drum, shoes, a cylinder within said drum, a plurality of pistons therein, means to admit fluid under pressure between said pistons, plungers between said pistons and shoes, rods axially threaded in said pistons, said rods having heads located adjacent each other near the middle of the cylinder in brake release position, said heads having clutch elements for mutual engagement in brake release position, and mechanism providing for each of said heads a yieldingly resisted limited axial movement whereby when the pistons are separated by the admission of pressure fluid the rods first travel jointly with the pistons and the clutch is disengaged and thereafter for movements of the pistons in excess of the limited movement provided for said heads the rods are rotated relative to the pistons to effect new release positions for the shoes and operating parts.

11. In a brake, a drum, shoes to engage the drum, a cylinder within the drum, opposed pistons in the cylinder, plungers between the pistons and shoes, a hollow block secured to said cylinder between said pistons, rods threaded in said pistons and having heads in said block, said heads having opposed clutch teeth adapted for mutual engagement, mechanisms carried by said block to provide a limited resiliently resisted axial movement of said rods together with said pistons to cause declutching of said heads, said rods thereafter being rotated to changed positions of adjustment axially of said pistons under continued piston movements to effect new release positions for the shoes and brake operating parts.

OLAF RASMUSSEN.